United States Patent [19]

Koike

[11] Patent Number: 5,751,430
[45] Date of Patent: May 12, 1998

[54] OUTPUT APPARATUS AND METHOD CAPABLE OF EMULATING A MODE OF RECEIVED DATA

[75] Inventor: Hisashi Koike, Sakura, Japan

[73] Assignee: Canon Kabushiki Kaisha, Tokyo, Japan

[21] Appl. No.: 580,275

[22] Filed: Dec. 27, 1995

Related U.S. Application Data

[63] Continuation of Ser. No. 38,489, Mar. 29, 1993, abandoned.

[30] Foreign Application Priority Data

Mar. 30, 1992 [JP] Japan .................... 4-074598

[51] Int. Cl.$^6$ .............. H04N 1/00; G06F 15/00; B41J 11/44
[52] U.S. Cl. .............. 358/296; 395/112; 400/76
[58] Field of Search .............. 358/296, 448; 395/112, 114, 116; 400/61, 70, 76; 382/181, 189, 254, 276, 278, 309, 311

[56] References Cited

U.S. PATENT DOCUMENTS

| | | | |
|---|---|---|---|
| 4,509,122 | 4/1985 | Agnew et al. | 364/200 |
| 4,968,159 | 11/1990 | Sasaki et al. | 400/76 |
| 5,050,098 | 9/1991 | Brown, III et al. | 364/519 |
| 5,075,874 | 12/1991 | Steeves et al. | 395/112 |
| 5,228,118 | 7/1993 | Sasaki | 395/112 |
| 5,268,993 | 12/1993 | Ikenoue et al. | 395/114 |
| 5,332,320 | 7/1994 | Ohara | 400/76 |
| 5,469,373 | 11/1995 | Kashiwazaki et al. | 395/112 X |

FOREIGN PATENT DOCUMENTS

WO9204672  3/1992  WIPO .................. G06F 3/12

*Primary Examiner*—Eric Frahm
*Attorney, Agent, or Firm*—Fitzpatrick, Cella, Harper & Scinto

[57] ABSTRACT

An output apparatus and method of a printer or display which receives commands from a host computer and executes subsequent data processes are provided. The apparatus includes a selector for analyzing data in a predetermined region of data received from the outside and for selecting one of a plurality of emulation modes, and a controller to control the selector in a manner such that in the case where the selector cannot specify to one emulation mode, the data in the predetermined region analyzed by the selector is changed and again analyzed. Also, the data in the predetermined region indicates a predetermined data amount. The controller adds data excluding at least the data in the predetermined region to the data in the predetermined region analyzed by the selector and allows the selector to again analyze the resultant data.

32 Claims, 6 Drawing Sheets

| COMMAND | HEX CODE | A | B | C |
|---|---|---|---|---|
| SI | 0F | ○ | ○ | × |
| XON | 11 | ○ | × | × |
| DC1 | 11 | × | ○ | × |
| DC2 | 12 | × | ○ | × |
| XOFF | 13 | ○ | × | × |
| DC3 | 13 | × | ○ | × |
| DC4 | 14 | × | ○ | × |
| CAN | 18 | × | ○ | × |
| ESC | 1B | ○ | ○ | ○ |
| IS2 | 1E | ○ | × | × |
| IS1 | 1F | ○ | × | × |
| SP | 20 | ○ | ○ | × |
| DEL | 7F | ○ | × | × |
| ESC : | 1B 3A | × | ○ | × |
| ESC < | 1B 3C | ○ | × | × |
| ESC = | 1B 3D | ○ | ○ | ○ |
| ESC > | 1B 3E | × | × | × |
| ESC ? | 1B 3F | ○ | × | ○ |
| ESC ? DC1 | 1B 3F 11 | × | × | ○ |

OUTPUT APPARATUS AND METHOD CAPABLE OF EMULATING A MODE OF RECEIVED DATA

This application is a continuation of application Ser. No. 08/038,489 filed Mar. 29, 1993, now abandoned.

BACKGROUND OF THE INVENTION

1. Field of the Invention

The present invention relates to an output apparatus and method of a printing apparatus, a display (CRT, LCD), or the like in which commands are received from a higher-order apparatus such as a host computer or the like and subsequent data processes are executed.

2. Description of the Related Art

In recent years, printing apparatuses which can print at a high resolution and a high quality have been proposed. Among such apparatuses, there is an apparatus (printer with an emulation mode) having a function to emulate a conventional printing apparatus in order to make it possible to continuously use application softwares which have been operated so far in a host computer.

Generally, in such an apparatus having an emulation mode, by setting a dip switch provided for the apparatus itself or by sending a corresponding command from the host computer, the corresponding command system is emulated. However, there is a problem such that the above setting operation is troublesome and there is also a case where the setting is wrong and a desired print result cannot be obtained.

Accordingly, in recent years, an attention has been paid to an apparatus having means for analyzing the type of input data from the host computer and for selecting an emulation problem which is considered to be most adaptive.

In a printing apparatus having a plurality of emulation modes, however, there is a problem such that in the case where as a result of the analysis of features of data stored in an input buffer, it is determined that a plurality of emulation modes which are considered to be most adaptive exist, so that it is difficult to select and determine a single most adapted emulation mode, or in the case where it is decided that the emulation mode which is considered to be most adaptive doesn't exist, the correct emulation mode is not always selected.

SUMMARY OF THE INVENTION

The present invention is made in consideration of the above conventional techniques and it is an object of the invention to provide an output apparatus and method having a plurality of emulation modes, in which the emulation mode that is desired by the user is selected at a high probability and an image is formed, printed, or displayed from the input data by the selected emulation mode.

To solve the above problems, an output apparatus of the present invention comprises: selecting means for analyzing data in a predetermined region in data received from the outside and for selecting an adapted emulation mode from a plurality of emulation modes; and control means for controlling the selecting means in a manner such that in the case where the selecting means cannot specify to one emulation mode, the data in the predetermined region analyzed by the selecting means is changed and is again analyzed.

The data in the predetermined region indicates a predetermined data amount.

The control means adds data, excluding at least the data in the predetermined region, to the data in the predetermined region analyzed by the selecting means and allows the selecting means to again analyze the resultant data.

To solve the above problems, an output method of the present invention comprises the steps of: analyzing data in a predetermined region in data received from the outside in order to select an emulation mode that is adapted to the received data; and controlling the analyzing process in a manner such that in the case where the analyzing process cannot specify to one emulation mode, the data in the predetermined region analyzed by the analyzing process is changed and the analyzing process is again executed.

The data in the predetermined region indicates a predetermined data amount.

The analyzing process adds data, excluding at least the data in the predetermined region, to the data in the predetermined region analyzed and again analyzes the resultant data.

Still another object of the invention is to provide an output apparatus and method in which even in the case where it is impossible to specify to one emulation mode, a result which the user intends to obtain can be obtained.

To solve the above problems, an output apparatus of the present invention comprises: selecting means for analyzing data in a predetermined region in data received from the outside and for selecting an adapted emulation mode from a plurality of emulation modes; and informing means for informing a list of the emulation modes which can be executed to the outside in the case where the selecting means cannot specify to one emulation mode.

The data in the predetermined region indicates a predetermined data amount.

The selecting means selects the instructed emulation mode from a plurality of emulation modes in accordance with an input of selection instruction information to select a desired emulation mode from the list of the emulation modes informed by the informing means.

To select the emulation mode adapted to the data received from the outside, the data in the predetermined region in the data is analyzed and in the case where it is impossible to specify to one emulation mode in the analyzing process, the list of the emulation modes which can be executed is informed to the outside.

The data in the predetermined region indicates a predetermined data amount.

The analyzing process selects the designated emulation mode from a plurality of emulation modes in accordance with an input of selection instruction information to select a desired emulation mode from the list of the emulation mode informed.

According to the present invention as described above, in the case where the emulation mode adapted to the received data cannot be specified, the amount of data to be analyzed is changed and the analyzing process is further executed, so that the emulation mode which the user wants to obtain can be selected at a higher probability.

In the case where the emulation mode adapted to the received data cannot be specified, the list of the emulation modes which can be executed is informed and the user selects a desired emulation mode which can be executed, so that the emulation mode which the user wants to obtain can be selected more certainly.

DETAILED DESCRIPTION OF THE PREFERRED EMBODIMENTS

Embodiments according to the present invention will now be described in detail hereinbelow with reference to the drawings.

A printing apparatus in the embodiments will be explained with respect to a laser beam printer as an example. As will be obviously understood from the following description, however, a printing method of the present invention can be also applied to a thermal transfer recording method, ink jet recording method, wire dot impact method, or the like. Therefore, the present invention is not limited by the printing method.

Figure 3:
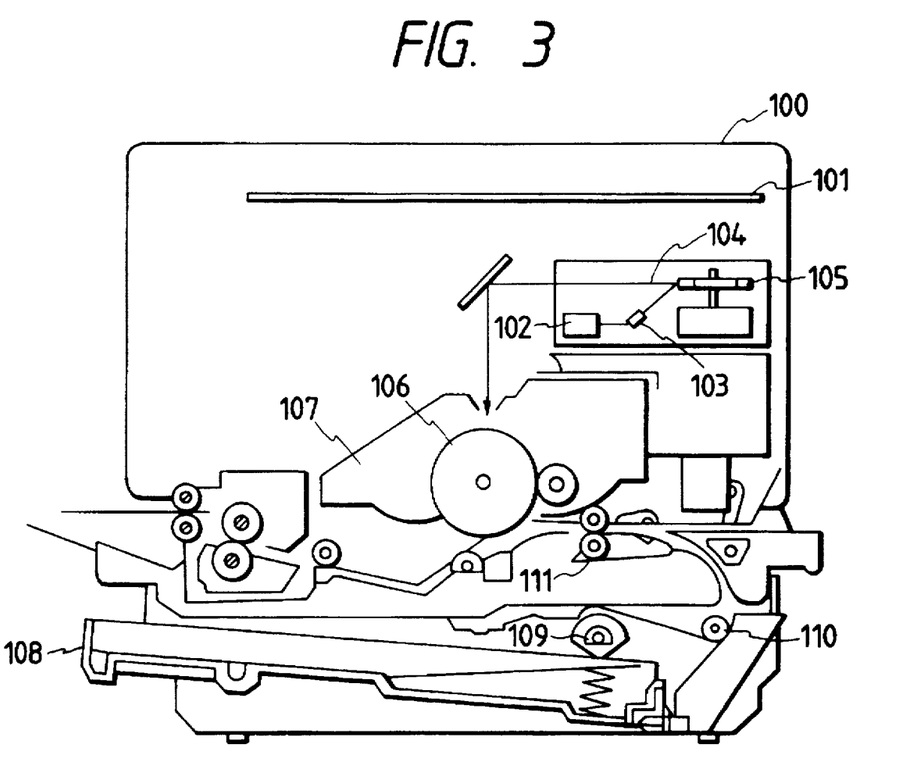
FIG. 3 is a cross sectional view showing a construction of a printing apparatus according to the embodiment.

FIG. 3 is a cross sectional view showing an internal structure of the printing apparatus (laser beam printer) according to an embodiment. The printer can register a character pattern, a fixed size format (form data), or the like from a data source of a host computer or the like.

In the diagram, reference numeral 100 denotes an LBP (laser beam printer) main body. The LBP 100 receives and stores print information (character code or the like), form information, macro instruction, or the like which is supplied from the host computer connected to the outside. The LBP 100 forms a corresponding character pattern, form pattern, or the like in accordance with those information and forms an image onto a recording paper as a recording medium. Reference numeral 101 denotes a printer control unit for controlling the whole LBP 100 and for analyzing character information or the like which is supplied from the host computer. The printer control unit 101 mainly converts the character information into the video signal of the corresponding character pattern and supplies the video signal to a laser driver 102.

The laser driver 102 is a circuit to drive a semiconductor laser 103. The laser driver 102 on/off switches a laser beam 104 which is emitted from the semiconductor laser 103 in accordance with the inputted video signal. The laser beam 104 is swung to the right and left by a rotary polygon mirror 105 and scans and exposes on an electrostatic drum 106. Thus, an electrostatic latent image of a character pattern is formed on the electrostatic drum 106. The latent image is developed by a developing unit 107 arranged around the drum 106. After that, the developed image is copy transferred onto the recording paper. A cut sheet is used as a recording paper. Cut sheet recording papers are enclosed in a sheet cassette 108 attached to the LBP main body 100 and are picked up one by one and fed into the apparatus and conveyed to the electrostatic drum 106 by a feed roller 109 and a conveying roller 110.

Figure 1:
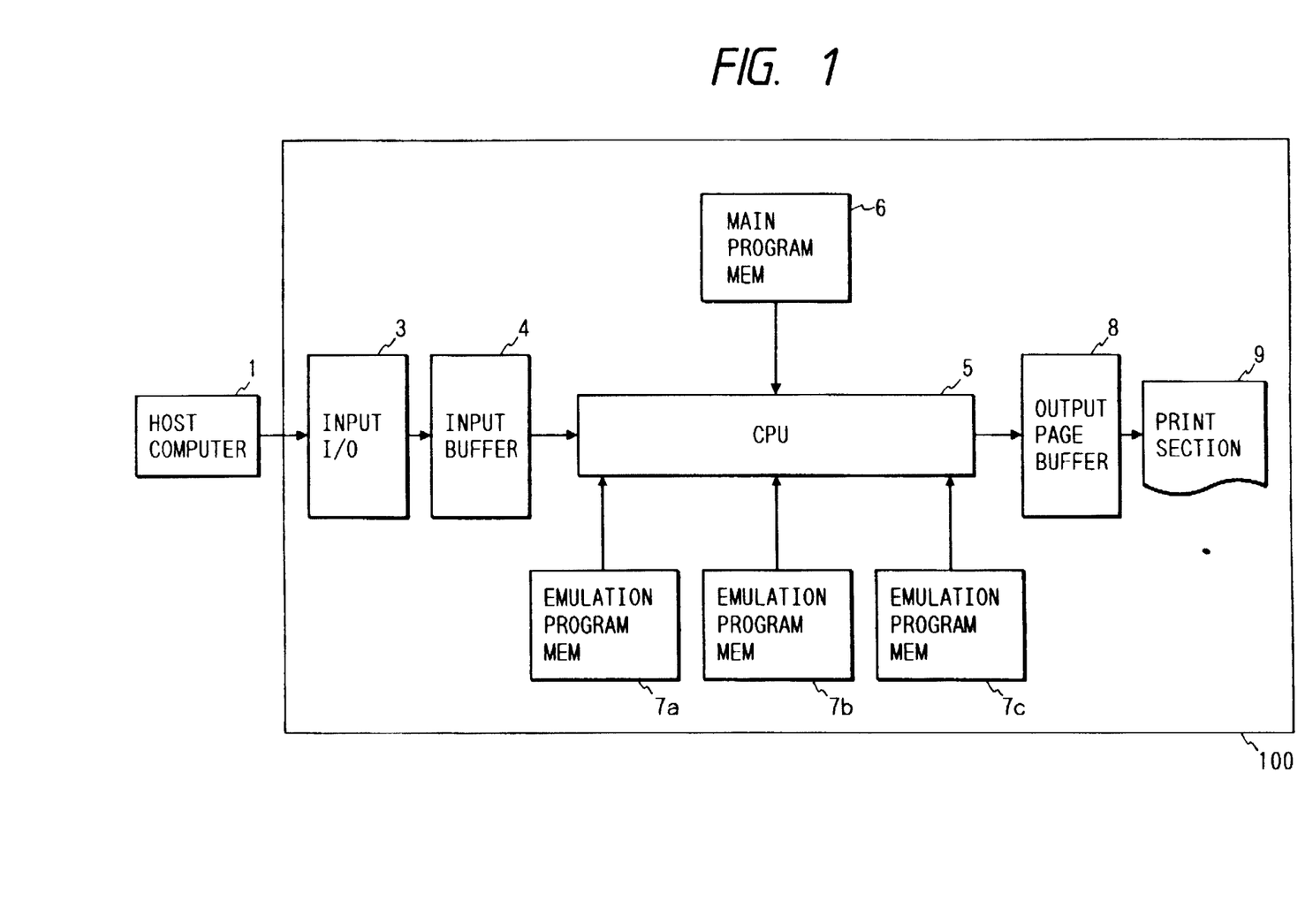
FIG. 1 is a block constructional diagram of a printing apparatus according to the first embodiment.

FIG. 1 shows a block constructional diagram of the printing apparatus according to the embodiment. Reference numerals 3 to 8 in the diagram denote component elements provided in the printer control unit 101.

A host computer 1 is connected to an input interface section 3 of the LBP 100. Print data consisting of a print code, a control code, and the like is transmitted from the host computer 1. The transmitted print data is once stored into an input buffer 4 through the input interface section 3. A CPU 5 analyzes the print data supplied from the host computer 1 in accordance with programs (programs according to flowcharts of FIGS. 2 and 5, which will be explained hereinafter) stored in a main program memory (comprising an ROM and an RAM) 6 and executes an outputting process. Different emulation programs A, B, and C have been stored in emulation program memories 7a to 7c, respectively. The CPU 5 analyzes the control code extracted from the input buffer 4 and selects the optimum emulation program and develops an output bit map pattern into an output page buffer 8 in accordance with the selected emulation program. After that, the bit map pattern developed in the output page buffer 8 is supplied as a video signal to a print section 9, thereby executing the printing process which has already been described in FIG. 3. A control command table shown in FIG. 6 has been stored for every emulation program in the main program memory 6 in order to discriminate that by which print language the inputted data is written.

Figure 6:
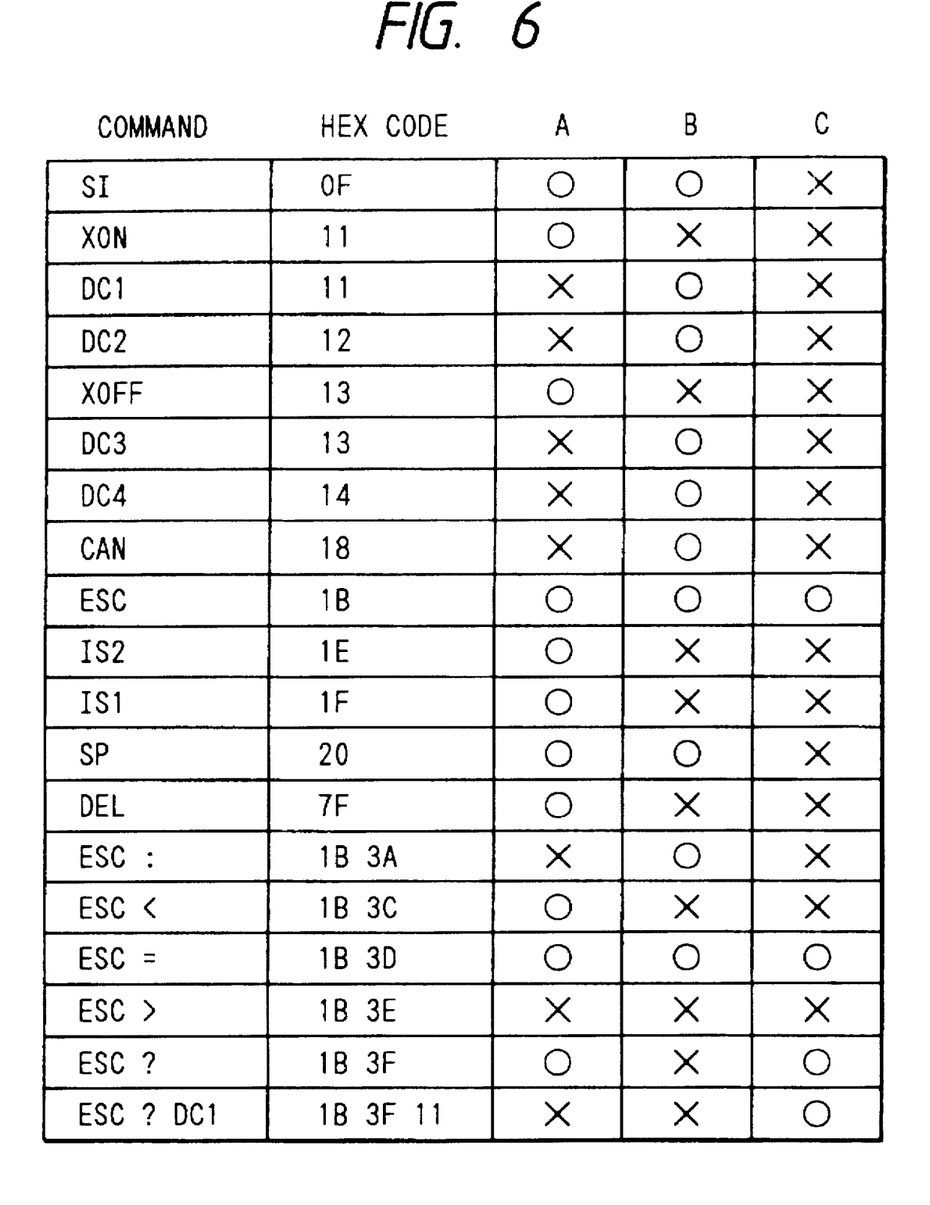
FIG. 6 is a diagram showing the presence or absence of adaptation between each command and the emulation program.

FIG. 6 will be explained hereinafter.

The contents of the operations and processes of the embodiment will now be described in accordance with the flowchart of FIG. 2. In the following description, it is now assumed that variables a and b have previously been held in predetermined addresses in the main program 6.

When data is received from the host computer 1 in a state in which there is a space area in the input buffer 4, the data is stored into the input buffer 4 through the input interface section 3 (steps S1 and S2). In step S3, a coefficient a of an analysis data amount is reset. Subsequently, the analysis data of only the amount of "a×b" is read from the head in the input buffer 4 (step S4). The type of data is analyzed (step S5). It is assumed that "b" indicates, for example, an initial analysis data amount specified.

In steps S6 to S8, during the processes to successively analyze the read-out data, a check is made to see if one of the corresponding emulation programs could be specified or not.

That is, when there is no corresponding emulation program or when two or more candidates exist as corresponding emulation programs, the value of "a" is increased by adding "1" (step S9) so long as an analysis data amount doesn't exceed the upper limit value (depending on a capacity of the RAM in the main program memory 6) of an amount of data which is read out and the data which is not yet analyzed exists in the input buffer. That is, data as a target of the analysis is increased and is again analyzed.

In the case where there are two candidates A and B of the emulation program in one analyzing process, one of the candidates which have already been mentioned as candidates is determined in the next analyzing process. That is, when it is determined in step S7 that there are a plurality of candidates, the result of the judgment is temporarily stored into the memory and the most adapted emulation program is decided in the next analysis from only among the plurality of candidates stored as mentioned above.

In the case where an amount of data to be read out exceeds the specified upper limit value or it is impossible to specify to one emulation mode because of the reason such that an amount of input data is small or when no corresponding emulation program exists in the processes in steps S4 to S9, the processing routine advances to step S10. In step S10, the emulation program is switched to the default emulation program and the processes are forcedly executed. In the case where there are a plurality of candidates, the processes can be also executed in accordance with one emulation program according to a predetermined priority.

In the case where one emulation program can be specified during the execution of the processes in steps S6 to S9, step S11 follows and the emulation program is switched to the corresponding emulation program (step S11).

By the above processes, in the case where a plurality of emulation programs having characteristic data (control codes) exist in the LBP, a target of the inputted data to be analyzed (an amount of data to be analyzed) is changed, so that one emulation program can be selected at a high probability. On the other hand, by setting an initial analysis data amount to a small value, the correct emulation program can be also selected in a short time for the data having a clear feature.

Although the first embodiment has been described on the assumption that the analyzing process is executed after the data was once received from the host computer, the receiving process and the process to store the received data into the buffer can be also executed by an interrupting process.

[Description of the Second Embodiment]

In step S9 in the embodiment mentioned above, in the case where the coefficient "a" of the analysis data amount is increased, for instance, a process of "a←a×c" can be also performed. It is now assumed that "c" is a specified constant larger than "1". In other words, the embodiment is characterized in that the data as a target to be analyzed is changed, and the present invention is not limited by an expression to specify such a target.

In step S4, a range of the target to be repetitively analyzed is not limited to a range from the start of the reception data. Particularly, in the case where it is decided that no corresponding emulation program exists, the data subsequent to the preceding analysis target range can be also used as a target to be analyzed.

Further, in step S10, the emulation program is not switched to the default emulation program but the process is regarded as an error process and the error process can be also informed by a liquid crystal display (hereinafter, referred to as an LCD) or the like (not shown).

[Description of the Third Embodiment]

In the foregoing first and second embodiments, in the case where the reception data is analyzed and it is impossible to finally specify to one emulation program, the default emulation program is selected or the printing process is not executed as an error process. However, there is a case where the user who operates the host computer 1 knows a format (command system) of the data such that the printing operation has been instructed by that user. In such a case, it is better for the user to designate such a data format himself rather than that the apparatus itself unconditionally selecting the default emulation program or the printing process being not performed as an error process.

The third embodiment intends to realize such a case.

Figure 4:
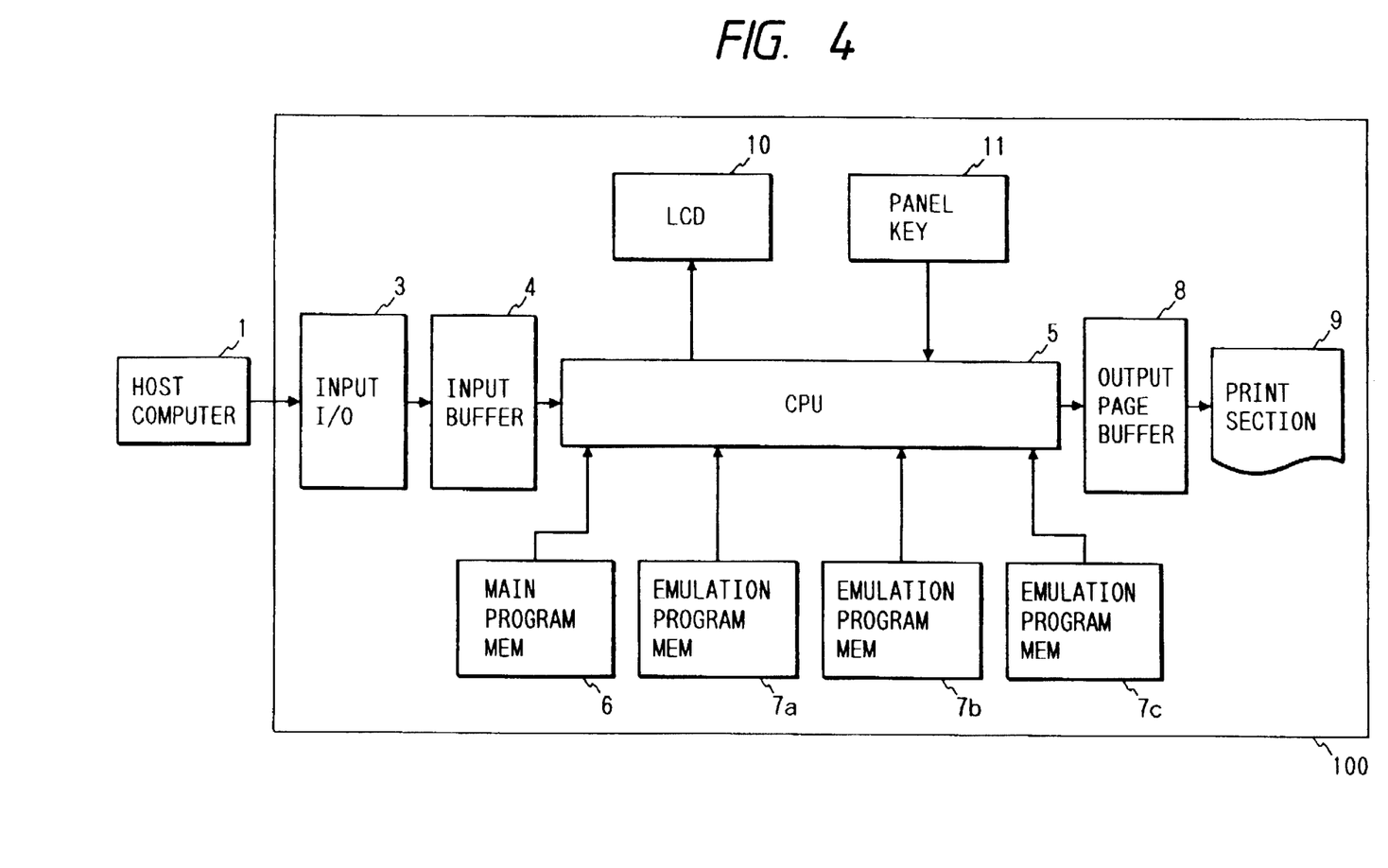
FIG. 4 is a block constructional diagram of a printing apparatus according to the third embodiment.

FIG. 4 shows a block constructional diagram of a printing apparatus according to the third embodiment.

In FIG. 4, the component elements similar to those in the first embodiment are designated by the same reference numerals and their descriptions are omitted. The third embodiment differs from the first embodiment with respect to a point that a liquid crystal display (hereinafter, referred to as an LCD) to display various kinds of messages and panel keys to give various kinds of operation instructions are provided.

The operation of the third embodiment will now be described in accordance with the flowchart of FIG. 5. A program based on such a flowchart has obviously been stored in the main program memory 6 and is executed by the CPU 5.

In steps S21 to S23, data is received and stored into an input buffer and the stored data is analyzed. In step S24, a check is made to see if the corresponding emulation program exists or not on the basis of the result of the analysis just before step S24.

When no corresponding emulation program exists, a buzzer (not shown) is rung, thereby informing the user of the fact of the occurrence of abnormality (step S25). A list of all of the emulation programs which the apparatus has is displayed on the LCD 10. Step S30 follows.

When it is determined in step S24 that some candidates exist, and when the processing routine advances to step S27, a check is made to see if a plurality of candidates exists or not. If YES, a buzzer is rung (step S28). A list of the emulation programs which can become the candidates is displayed on the LCD 10 (step S29).

In the case where one emulation program cannot be specified, the processing routine advances to step S30. However, since the candidates which can be selected (must be selected) have been displayed on the LCD 10 at that point in time, the user designates one of the displayed emulation programs by a panel key 11. In accordance with the designated emulation program, the inherent printing process corresponding to the received print data is executed (step S31).

As a result of the analysis, when it is decided that only one corresponding emulation program exists, the printing process is obviously executed in accordance with that emulation program.

In the third embodiment, the emulation program has been determined by one analyzing process. However, the third embodiment can be also combined with the foregoing first embodiment. Namely, as shown in the first embodiment, in the case where the data as a target to be analyzed is successively changed and the emulation mode cannot be finally specified to one emulation program, the most adapted emulation mode is designated by the user. To realize such a method, it is sufficient to replace the process in step S10 in FIG. 2 by processes in steps S24 to S31 in the third embodiment.

According to the third embodiment as described above, in the case where a plurality of emulation programs having the characteristic data (control codes) exists in the printing apparatus, the print data can be certainly printed by using the correct emulation program without selecting the wrong emulation program which the user doesn't want to use for the inputted data. On the other hand, even in the case where the user himself doesn't know the type of data received from the host computer, by displaying the names or the like of the candidate emulation programs, the operation for the user to check the type of data can be reduced.

In steps S25 and S28, it is sufficient to inform an abnormal state to the user. Therefore, for instance, such an abnormal state can be informed by the flickering of an LED or the like or a message indicative of such an abnormal state can be also displayed by the LCD 10.

In the case where the host computer 1 and the LBP 100 are connected by a bidirectional interface, in steps S26 and S29, in place of displaying the names or the like of the emulation programs (or simultaneously with such a display operation), data (for example, a message or the like) indicative of the emulation name or the like is sent and can be also displayed to the display such as a CRT or the like. In this case, the user supplies selection instruction information to select a desired emulation program as a command to the LBP 100 from the host computer.

When the result of the evaluation of the data analysis in step S23 is low (for instance, because of a reason such that an amount of data which can be analyzed is small or the like), in step S27, even when only one adapted emulation program exists, it is also possible to ring an alarm buzzer and to request for the judgment of the user in a manner similar to the case where there are a plurality of candidates.

Further, in the case where the LBP itself doesn't have a desired emulation program of the user, the reset of the reception data can be also instructed in step S10.

In the above embodiments, the bit map pattern developed in the output page buffer 8 is supplied to the print section 9. However, it is also possible to generate the bit map pattern to the display such as a CRT or the like and to display it.

A control command table (FIG. 6) of every emulation program will now be described.

The command systems A, B, and C shown in FIG. 6 indicate the emulation programs A, B, and C stored in the emulation program memories 7a, 7b, and 7c shown in FIG. 1, respectively. For instance, a command such as "SI" indicates a command code included in the received data. The command "SI" indicates that although the control codes are included in the emulation programs A and B, the control code is not included in the emulation program C. Therefore, the analyzing process of the data type in step S5 and subsequent steps in FIG. 2 and step S23 and subsequent steps in FIG. 5 mentioned above will now be described with reference to the control command table shown in FIG. 6.

For instance, when a command "XON" as characteristic data (control command) to specify the emulation program A stored in the emulation program memory 7a exists in the data read out from the input buffer 4, the emulation program adapted to the read-out data is specified to the emulation program A. In the case where a plurality of various commands as characteristic data (control codes) to specify the emulation programs as mentioned above exist in the read-out data, the emulation program including a largest amount of characteristic data to specify the emulation programs in the read-out data can be also specified to the emulation program adapted to the read-out data.

Figure 2:
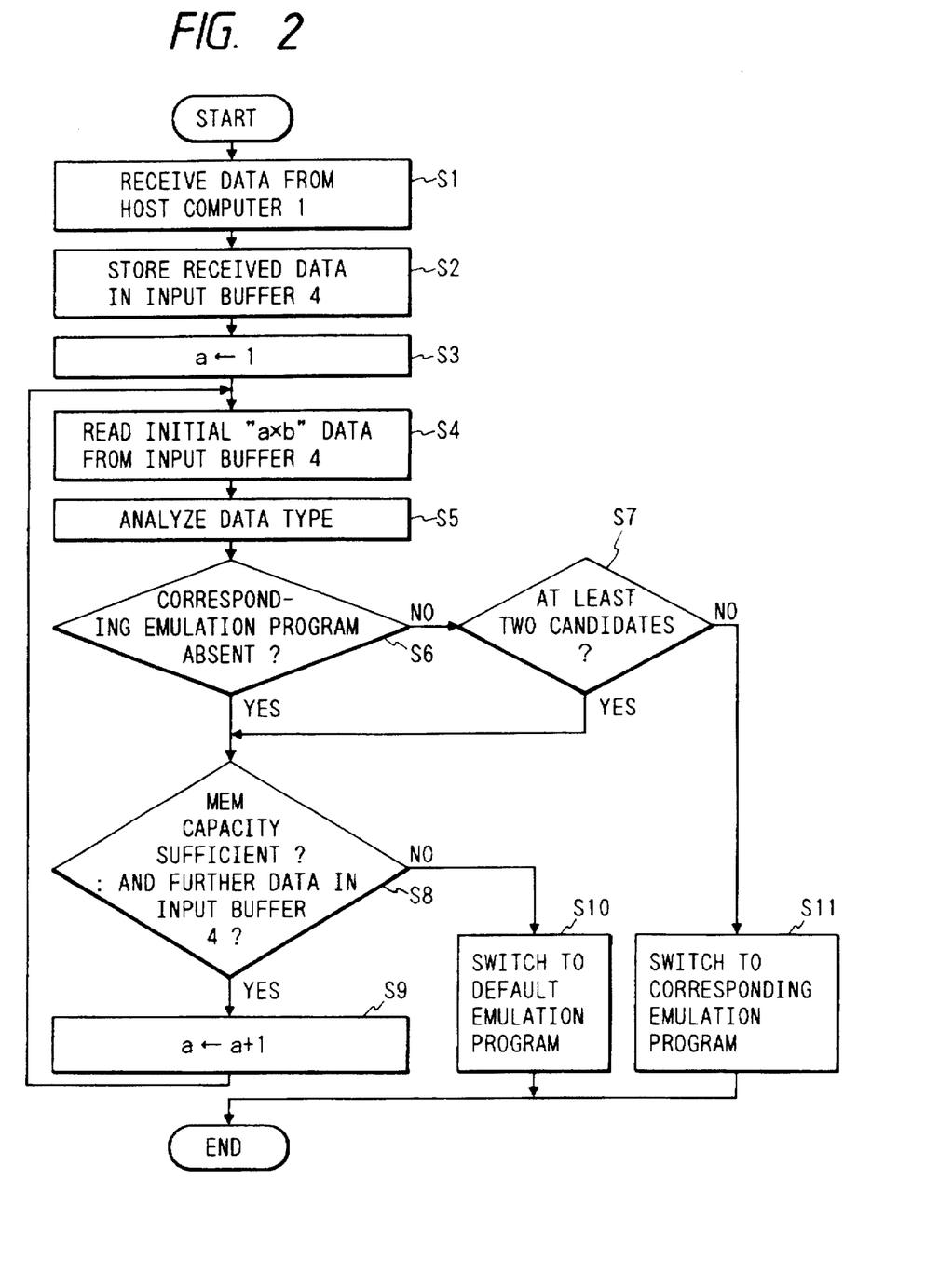
FIG. 2 is a flowchart showing the contents of the operations and processes in the first embodiment.
Figure 5:
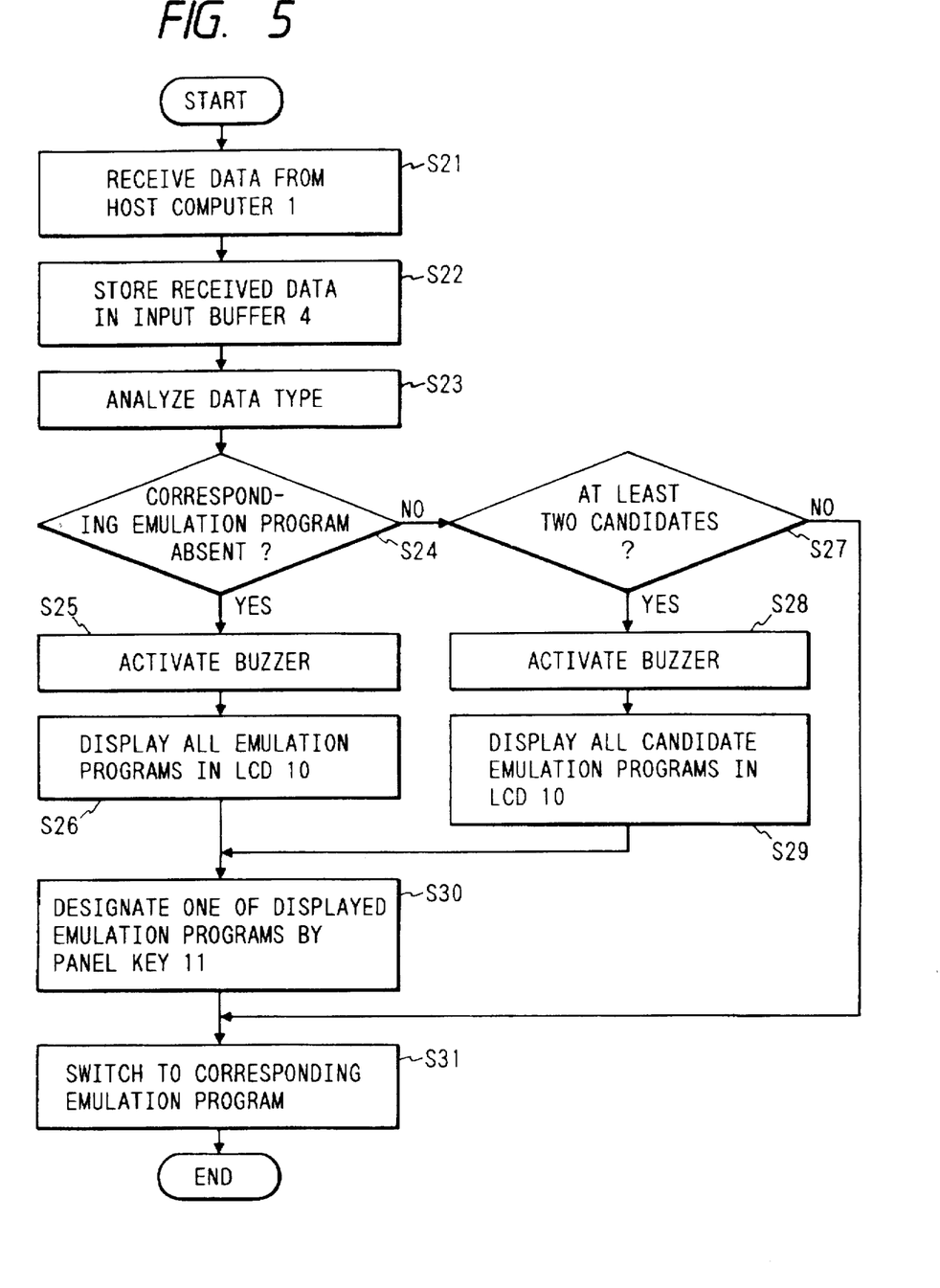
FIG. 5 is a flowchart showing the contents of the operations and processes in the third embodiment.

For example, in the case where the characteristic data to specify the emulation program doesn't exist in the read-out data, namely, when the corresponding emulation program cannot be specified, the processes in step S6 and subsequent steps shown in FIG. 2 or step S24 and subsequent steps shown in FIG. 5 according to the embodiments are executed.

In the case where the number of characteristic data (control codes) to specify each emulation program in the read-out data is equal, namely, when there are a plurality of candidates of the corresponding emulation program, the processes in step S7 and subsequent steps shown in FIG. 2 or step S27 and subsequent steps shown in FIG. 5 according to the foregoing embodiments are executed.

The invention can be applied to a system constructed by a plurality of apparatuses or an apparatus constructed by one apparatus. The invention can be also applied to the case where the invention is accomplished by supplying a program to such a system or apparatus.

What is claimed is:

1. An output apparatus comprising:

storing means for storing data received from an external apparatus;

selecting means for analyzing a predetermined amount of data included in the data stored in said storing means and for selecting an optimum emulation mode from a plurality of emulation modes;

control means for controlling said selecting means to change the predetermined amount of data to another amount of data and to analyze the another amount of data included in the stored data, in a case where said selecting means cannot specify one emulation mode, to thereby select an emulation mode; and said predetermined region analyzed by said selecting means is output means for generating pattern data from the data stored in said storing means in the emulation mode selected by said selecting means and for outputting the generated pattern data.

2. An output apparatus according to claim 1, wherein said selecting means refers to a command table in selecting the optimum emulation mode for the received data.

3. An output apparatus according to claim 1, wherein if two candidate optimum emulation modes exist, said control means controls said selecting means to select a single optimum emulation mode from the two candidate optimum emulation modes.

4. An output apparatus according to claim 1, wherein said selecting means selects a default emulation mode when said selecting means cannot select a single optimum emulation mode in spite of a selection based on the another amount of data.

5. An output apparatus according to claim 1, wherein said output means comprises an ink jet printer for outputting the pattern data.

6. An output apparatus according to claim 1, wherein said output means comprises a laser beam printer for outputting the pattern data.

7. An output method comprising the steps of:

storing data received from an external apparatus;

analyzing a predetermined amount of data included in the stored data in order to select an optimum emulation mode;

controlling said analyzing step to change the predetermined amount of data to another amount of data and to analyze the another amount of data included in the stored data; in a case where said analyzing step cannot specify one emulation mode, to thereby select an emulation mode; and generating pattern data from the stored data in the selected emulation mode and outputting the generated pattern data.

8. An output method according to claim 7, wherein said analyzing step comprises referring to a command table to select the optimum emulation mode for the received data.

9. An output method according to claim 7, wherein if two candidate optimum emulation modes exist, said controlling step comprises controlling said analyzing step to select the optimum emulation mode from the two candidate optimum emulation modes.

10. An output method according to claim 7, wherein said analyzing step comprises selecting a default emulation mode when said analyzing step cannot select a single optimum emulation mode in spite of a selection based on the another amount of data.

11. An output method according to claim 7, wherein said generating and outputting step outputs the pattern data using an ink jet printer.

12. An output method according to claim 7, wherein said generating and outputting step outputs the pattern data using a laser beam printer.

13. An output apparatus comprising:

storing means for storing data received from an external apparatus;

selecting means for analyzing a predetermined amount of data included in the data stored in said storing means and for selecting an optimum emulation mode from a plurality of emulation modes;

means for generating pattern data from the data stored in said storing means in the emulation mode selected by said selecting means and for outputting the generated pattern data; and informing means for informing the external apparatus of names of a plurality of emulation modes from among the plurality of emulation modes that can be executed in a case where said selecting means cannot select the optimum emulation mode.

14. An apparatus according to claim 13, wherein said selecting means selects a designated emulation mode from among the plurality of emulation modes informed by said informing means in response to designation information being inputted from the external apparatus to select a desired emulation mode.

15. An output method comprising the steps of:

storing data received from an external apparatus;

analyzing a predetermined amount of data included in the stored data in order to select an optimum emulation mode; and generating pattern data from the stored data in the selected emulation mode and outputting the generated pattern data in the case where said analyzing step can specify an optimum emulation mode, and informing the external apparatus of names of emulation modes that can be executed in a case where said analyzing step cannot specify an optimum emulation mode.

16. A method according to claim 15, wherein said analyzing step comprises selecting a designated emulation mode from among the emulation modes informed to the external apparatus in response to designation information being inputted from the external apparatus to select a desired emulation mode.

17. An output apparatus comprising:

storing means for storing data received from an external apparatus;

selecting means for analyzing a predetermined amount of data included in the data stored in said storing means and for selecting an optimum emulation mode from among a plurality of emulation modes;

means for generating pattern data from the data stored in said storing means in the emulation mode selected by said selecting means and for outputting the generated pattern data; and display means for displaying names of a plurality of emulation modes that can be executed in a case where said selecting means cannot specify the optimum emulation mode.

18. An output apparatus according to claim 17, wherein said selecting means selects a designated emulation mode from among the plurality of emulation modes displayed by said display means in response to designation information to select a desired emulation mode being key inputted.

19. An output method comprising the steps of:

storing data received from an external apparatus;

analyzing a predetermined amount of data included in the stored data in order to select an optimum emulation mode; and generating pattern data from the stored data in the selected emulation mode and outputting the generated pattern data in a case where said analyzing step can specify the optimum emulation mode, and displaying names of emulation modes that can be executed in a case where said analyzing step cannot specify the optimum emulation mode.

20. An output method according to claim 19, wherein said analyzing step selects a designated emulation mode from the displayed emulation modes in response to designation information to select a desired emulation mode being key inputted.

21. A data analyzing apparatus comprising:

a memory for storing data received from an external apparatus;

a selector for analyzing a predetermined amount of data included in the data stored in said memory and for selecting an optimum emulation mode from a plurality of emulation modes; and a controller for controlling said selector to change the predetermined amount of data to another amount of data and to analyze the another amount of data included in the stored data, in a case where said selector cannot specify one emulation mode, to thereby select an emulation mode.

22. A data analyzing apparatus according to claim 21, wherein said selector refers to a command table in selecting the optimum emulation mode for the received data.

23. A data analyzing apparatus according to claim 21, wherein, if two candidate optimum emulation modes exist, said controller controls said selector to select a single optimum emulation mode from the two candidate optimum emulation modes.

24. A data analyzing apparatus according to claim 21, wherein said selector selects a default emulation mode when said selector cannot select a single optimum emulation mode in spite of a selection based on the another amount of data.

25. A data analyzing apparatus comprising:

a memory for storing data received from an external apparatus;

a selector for analyzing a predetermined amount of data included in the data stored in said memory and for selecting an optimum emulation mode from a plurality of emulation modes; and a controller for informing the external apparatus of names of a plurality of executable emulation modes from among the plurality of emulation modes in a case where said selector cannot select the optimum emulation mode.

26. A data analyzing apparatus according to claim 25, wherein said selector selects a designated emulation mode from among the plurality of emulation modes informed by said controller to the external apparatus in response to designation information to select a desired emulation mode being inputted from the external apparatus.

27. A data analyzing apparatus comprising:

a selector for analyzing a predetermined amount of data included in data received from an external apparatus and for selecting an optimum emulation mode from among a plurality of emulation modes; and a controller for displaying names of a plurality of executable emulation modes in a case where said selector cannot specify the optimum emulation mode.

28. A data analyzing apparatus according to claim 27, wherein said selector selects a designated emulation mode from among the plurality of emulation modes displayed by said controller in response to designation information to select a desired emulation mode being key inputted.

29. A data analyzing apparatus comprising:

a memory for storing data received from an external apparatus;

a selector for analyzing a predetermined amount of data included in the data stored in said memory and for selecting an optimum emulation mode from a plurality of emulation modes;

a display panel; and a controller for displaying on said panel names of a plurality of executable emulation modes from among the plurality of emulation modes in a case where said selector cannot select the optimum emulation mode.

30. A data analyzing apparatus according to claim 29, wherein said selector selects a designated emulation mode from among the plurality of executable emulation modes displayed on said panel by said controller in response to designation information to select a desired emulation mode being inputted from the external apparatus.

31. A data analyzing apparatus comprising:

a selector for analyzing a predetermined amount of data included in data received from an external apparatus and for selecting an optimum emulation mode from among a plurality of emulation modes;

a display panel; and a controller for displaying on said panel names of a plurality of executable emulation modes from among the plurality of emulation modes in a case where said selector cannot select the optimum emulation mode.

32. A data analyzing apparatus according to claim 31, wherein said selector selects a designated emulation mode from among the plurality of executable emulation modes displayed on said panel by said controller in response to designation information to select a desired emulation mode being key inputted.

* * * * *

UNITED STATES PATENT AND TRADEMARK OFFICE
CERTIFICATE OF CORRECTION

PATENT NO. : 5,751,430
DATED : May 12, 1998
INVENTOR(S) : Koike

It is certified that error appears in the above-indentified patent and that said Letters Patent is hereby corrected as shown below:

COLUMN 1:

Line 31, "an" should be deleted.

COLUMN 8:

Line 8, "said predeter-" should be deleted; and
Line 9 should be deleted.

Signed and Sealed this

Seventeenth Day of November, 1998

Attest:

BRUCE LEHMAN

Attesting Officer      Commissioner of Patents and Trademarks